Patented Oct. 15, 1929

1,732,027

UNITED STATES PATENT OFFICE

WILLIAM BEACH PRATT, OF WELLESLEY, MASSACHUSETTS, ASSIGNOR, BY MESNE ASSIGNMENTS, TO DISPERSIONS PROCESS, INC., OF DOVER, DELAWARE, A CORPORATION OF DELAWARE

AQUEOUS RUBBER DISPERSION

No Drawing.  Application filed September 13, 1923. Serial No. 662,556.

The object of this invention is to disperse crude, or coagulated, rubber in water, so as to produce a mass of such consistency as may be desired, in which the rubber is in the form of globules of substantially the same size and form in which they occurred in the original latex from which the crude rubber was coagulated.

For some years it has been my theory that the original globules of rubber in latex preserve their identity during the subsequent coagulation thereof, and possibly even in the state of vulcanization, and that though during coagulation the globules become mechanically adherent to form a coherent mass, yet they are capable of separation and dispersion. It is known that, when coagulated rubber is "dissolved" in benzol, for example, the rubber absorbs the benzol with a subsequent swelling to about four times its original volume, and I am of the opinion that when a rubber mass is thus "dissolved" in benzol, the individual globules are each swollen and their interfacial tension is lessened so that they thereby tend to, and do separate from one another. In support of this theory, I call attention to the fact that one may disperse rubber in water by first dissolving the mass of coagulated rubber in benzol, and, by the aid of an agent such as soap, then dispersing the solution in water and finally extracting the benzol, leaving the rubber globules dispersed in the water, all as set forth in my application, Serial No. 631,451, filed April 11, 1923. In this operation, the free benzol, together with such benzol as was absorbed by the individual rubber globules, is removed. There is, however, a certain economic objection in effecting the dispersion of the rubber according to the process outlined, for when the crude rubber "dissolves" in the benzol, the benzol is absorbed by the rubber globules, and in the removal of the benzol from the globules some care must be exercised and some time consumed to ensure the complete removal of the benzol without causing recoagulation.

I have, however, as a result of prolonged experimentation, found a method of separating and dispersing the globules of rubber in water without the necessity of first forming a solution of the coagulated rubber with a rubber solvent, and thus avoiding the use of inflammable materials and the necessity of effecting a recovery of the solvent.

It is commonly known that rubber latex in its original state contains, in addition to water and the rubber globules, certain other substances, in relatively small amounts, which are more or less akin to certain saponins, resins, proteins, and, possibly, fatty acids or their esters. In all likelihood, the function of certain of these substances is to provide a film or protective coating for the individual globules in the latex, by which their dispersion is maintained therein. In the process of coagulation of the globules, these protective coatings doubtless become machanically adherent, and when their facial contact with contiguous globules increases in area the globules are physically distorted, and consequently there is formed a coherent mass which is capable of being manipulated on account of the mechanical adhesion of the globules through their protective coatings. Many of these substances which are found in latex are water-soluble or water-absorbent, and in coagulation and drying the water is removed. This may account for the fact that a mass of crude rubber, when worked with a certain amount of water, tends to swell, since the water may be reabsorbed by the water-soluble substances in the rubber, some of which form the protective coatings of the globules.

It has been my theory that if water could be introduced into the rubber mass so as, by penetrating the interstices between the rubber globules, to restore the functions of the protective coatings, to reduce the interfacial tensions of the globules, and to permit the restoration of the globules to their original shape through the change in their surface tension, the rubber globules would become mechanically separated from adjacent globules. Under these conditions, it should be possible for the rubber globules to be dispersed in water to the same extent to which these globules were dispersed in the original latex. With the removal from the latex of the water from the water-soluble substances (some of which, as stated, I believe form the protective coatings of the terpene centers of the globules), these water-soluble substances greatly increase in tensile strength and the globules are bound together more tightly; and, conversely, when they again absorb water, this tensile strength is decreased so that the mechanical adhesion of the protected globules is decreased, and they then perform substantially the function of a lubricant while still performing the function of a protective film or coating for the terpene centers of the globules. In any event, whether or not my theory is correct, I have discovered that it is possible, by carrying out the process which I have hereinafter outlined, to disperse in water previously coagulated or crude rubber and kindred substances, such as balata and gutta percha, so that the globules in the final product are substantially identical in all respects, with the globules in the latex from which the coagulated product was derived.

The process, broadly stated, comprises two steps, to wit incorporating water with or without a water-carrying colloid into the mass of crude rubber, and then dispersing the mass in water, so as to produce a product of the desired consistency, consisting of water as the continuous phase, and rubber globules as the disperse phase of the dispersion. In introducing the water into the rubber mass, the technique of the process depends to some extent upon the character thereof and the manner in which the coagulation was effected. In most cases I find that it is desirable to use, in connection with the water, some water-soluble or water-carrying colloidal substance which will assist the water in penetrating into the interglobular spaces and ensure the presence of protecting films or coatings for the globules. For this purpose there may be used glue, albumin, casein, water-soluble gums such as gum arabic, glutins, starches, dextrin and other different water-soluble or water-carrying colloidal substances. These substances, however, are not always essential for the absorption of the water in rubber, since they are employed only for economy of time in conditioning the rubber for dispersion, for if sufficient time and manipulation be employed, the water alone can be introduced into the rubber mass by absorption. It has already been noted in the literature, as physical phenomena, that crude or coagulated rubber will absorb from 16 to 26 percent of its weight of water, that the non-water constituents of latex absorb water readily, and that the so-called sprayed rubber or rubber which has been coagulated by spraying, drying or evaporation of the entire water content, contains a larger proportion of the water-soluble substances, which are characteristic of the latex serum, than are contained in rubbers which have been coagulated out of the latex. Such coagulated rubbers as contain the larger percentage of the water-soluble constituents of the latex are capable of absorbing a greater quantity of water and with a greater rapidity than rubbers which have been coagulated out of the latex. Hence with such rubbers containing a high percentage of water-soluble substances, it is especially unnecessary to employ any of the substances hereinbefore mentioned with the water to effect its initial absorption by the rubber mass.

After the first step of conditioning the rubber mass, by causing it to absorb water, has been performed, so that the interfacial tension of the globules is reduced to the minimum, the rubber may then be dispersed in water by a simple mechanical mixing operation, during which water is added until a paste is finally formed, in which water forms the continuous phase. On removal of the water or on the application of any of the usual coagulating agents or processes, the dispersed rubber globules again coagulate.

I have found in the initial conditioning of the rubber mass, and also in effecting the formation of the paste that the manipulation of the rubber mass should preferably be such as to subject it to a continued stretching or kneading operation and this should preferably take place without subjecting the mass to mechanical pressure, such as would be caused by bringing the mixing blades into contact with each other or with the surface of the container, or such as would be caused by the employment of a colloidal mill, so-called, in which the operating faces of the mill are brought into very close facial contact. That is to say, if the mass of rubber or successive portions thereof be subjected to a continuous or intermittent stretching or kneading operation in the presence of water, the water will more easily find its way into the interglobular spaces, since the relative movement of the globules during this stretching operation tends to separate the globules and cause them to slip relatively to one another; and, conversely, when the rubber mass is subjected to mechanical pressure, the latter tends to increase the interfacial contact of the rubber globules and coalesce the mass, making it more difficult for the water to penetrate into the interglobular spaces.

In practice, the initial absorption of the water may be accomplished by the use of the ordinary compounding or mixing mill (one employing smooth-surfaced rolls rotating at different speeds, the faces of which do not come into contact) or by the use of a suitable apparatus such as a dough mixer. In effecting the conditioning of the rubber, the water should be gradually added to the rubber mass, to be absorbed by it during its milling or mixing. The water may be added alone, though preferably in a solution of any suitable water-soluble or water-carrying substance such as hereinbefore indicated, or if desired, the water-soluble substances, while commercially dry, may be first introduced into and compounded with the rubber on the mill, and the water then added. After the rubber has been caused to absorb say about five to ten percent of its weight of water, assuming that this operation has been performed by a mill, as hereinbefore described, the mass is now transferred to a mixing apparatus of the character of a dough mixer, and water gradually added thereto, whereupon a paste is formed in which the rubber is uniformly dispersed in the form of globules, which are substantially identical, in all respects, with the globules in the original latex from which the coagulated rubber was derived. This final dispersion is best accomplished in certain cases by adding to the water some substance of a colloidal or soapy or lubricating character, such, for example, as certain of the saponins, soap bark extract, soaps, certain water-soluble oils, or any substance which will promote the slipping of globule upon globule without adhesion. For example, I have secured excellent results by employing a relatively small quantity of soap bark extract dissolved in water and slowly kneading it into the conditioned rubber mass. The rubber first assumes a somewhat granular appearance but with the continued stretching of the mass, due to the operation of the mixer blades, and with the gradual addition of the water, the mass becomes of a smoother consistency until it reaches the consistency of a very smooth putty. Continued addition of water results in the formation of a salve almost of the consistency and smoothness of butter, and finally, with a continued addition of sufficient water a milky mass is produced which has substantially the physical and chemical characteristics of latex and in which the substantially uniform rubber globules are dispersed as in latex.

I do not mean to confine myself to the use of any particular substance with water in the initial conditioning of the rubber, or to the use of any particular substance with the water in the final mixing and dispersing operation. In some cases, as previously pointed out, it is unnecessary to employ any substance with the water in effecting the initial absorption of the water by the rubber, but if such substances are employed, they should preferably be of such character as to possess the capacity of assisting the water in penetrating into the interglobular interstices of the rubber mass. For this purpose they should also be primarily of such character as to assist in or permit the relative movement or slipping of the globules in the milling operation and while the rubber mass is undergoing a stretching operation, as described. In the second stage of the operation, during which the rubber globules become the disperse phase of the dispersion, it is desirable to employ substances which possess lubricating characteristics. Care should be exercised in performing the second stage of the operation not to introduce the water too rapidly or to employ too large a proportion of the lubrication agent, as either tends to permit the rubber to form in relatively large groups of globules the individual globules of which are separated and dispersed with difficulty. Again, in carrying out the second stage of the operation, one may proceed either by first working into the mass of rubber by a two-blade mixer, as hereinbefore referred to, a solution of the water-soluble substance in relatively small quantities until the mass assumes a smooth paste-like form, and then gradually adding water, or else by forming an aqueous paste of said substance and incorporating it into the rubber mass, and finally adding enough water to form a paste of the desired consistency. While I have stated that the initial conditioning of the rubber by the absorption of water may be accomplished by the usual rubber mill and the mass then transferred to a mixer, it is quite evident that the whole operation may be accomplished in a single mixing machine of the character of a dough mixer or any other mixer of suitable type which will have the strength to function with such a tough rubber mass, and to stretch and knead the coherent mass.

As an example of the procedure which may be followed in carrying out the process herein described, the following will suffice:—

550 parts of coagulated crude rubber, such as "smoked sheet", is placed on a mixing or compounding mill of the character hereinbefore referred to, and is milled until the rubber becomes warm and plastic. To this add 27.5 parts (by weight) of glue (representing 5 percent by weight of the mass of rubber), and the mixture is milled until the glue is thoroughly incorporated in the rubber. The glue which is used may be any of the commercial water-soluble or water-carrying glues, and it may be added either in the dry granular form or else in the form of a thick paste made by heating together the glue with a small quantity of water. The rubber-glue mixture is then transferred to a suitable mixing machine, such as a two blade dough mixer, (e. g., a Werner & Pfleiderer mixer) sufficient water to bring the total water content up to about ten percent by weight of the rubber is added, and the mixer is covered and is then allowed to run until the rubber has absorbed all of the water. During this operation of absorption of water by the rubber, the latter becomes quite warm. A solution of one part of saponin to two parts of water is prepared. Of this solution take 82.5 parts by weight, representing five per cent of saponin and ten per cent of water, both percentages based on the weight of the rubber, and after heating, add the same slowly until the rubber mass assumes a putty-like condition. The balance of the saponin solution is gradually added and the entire mass finally and gradually diluted with approximately 250 parts of hot water. The mixing is continued until the water is thoroughly incorporated throughout the mass, whereupon it will be found that a smooth paste. is produced in which the rubber has been dispersed in the form of globules. This rubber dispersion may be stored in this condition or it may be diluted with water to any desired consistency.

Microscopic examinations of dispersions produced as herein described show the rubber globules to be of the same size and the same general appearance as rubber globules in latex, and the same physical characteristics are manifested.

It should be understood that instead of employing five per cent of glue I may, if I so desire, use more or less than this amount, or that I may use any or none of the colloidal substances previously mentioned, as possessing the faculty of aiding the introduction of the water into the rubber and supplying the protective coatings for the rubber globules. Nor do I confine myself to the use of any particular amount of saponin or to any particular substance in effecting the final dispersion, since the amounts and the materials stated in the example are merely by way of illustration.

There is a decided advantage in the procedure or process which I have herein outlined, as it is possible thereby to produce a thick aqueous paste of uniformly dispersed rubber which may be used in the arts for subsequent vulcanization, all without the necessity of first forming a dilute dispersion and then subsequently concentrating the same by the removal of water, for, in accordance with the herein described process, the thick paste is produced initially and may be thinned or diluted as desired by the addition of water thereto.

In carrying on the process one is not restricted to one grade of crude rubber or to any particular kind of crude rubber or mixtures of crude rubber, for there may be compounded with the crude rubber, when it is being softened on the mill, reclaimed previously vulcanized rubber. I have prepared in the usual manner a mixture of 50 parts by weight of crude rubber and 50 parts by weight of a reclaimed vulcanized rubber, and by practicing the process herein described have obtained an aqueous dispersion in which the reclaimed vulcanized rubber was as completely dispersed as the crude or unvulcanized rubber. If desired, one can disperse a properly prepared reclaimed vulcanized rubber without mixing crude rubber therewith. I use the term "coagulated rubber" to include crude rubber and also vulcanized rubber which has been subjected to a reclaiming treatment which renders it sufficiently plastic to form a coherent mass. Moreover, one may compound with crude rubber, on the mixing mill, such materials as sulphur, rubber accelerators so-called, organic or inorganic pigments, organic softeners, coloring matter and/or many other substances. In such case these various ingredients may all be compounded with the rubber according to standard practice, after which a paste thereof is formed by following the procedure herein outlined in connection with crude rubber; or, if desired, instead of initially compounding these various ingredients with the crude rubber, an aqueous paste of dispersed rubber may first be produced as hereinbefore described and the compounding materials subsequently added thereto so as to produce a paste mixture which is capable of various applications in the arts.

By the procedure herein outlined it is possible to effect a uniform dispersion of the previously coherent rubber mass, by the employment of a small proportion of a water-carrying colloid in conditioning the rubber for dispersion, and apparently this is made possible by the actual manipulation of the rubber mass. When the coherent rubber mass is being milled on the compounding rolls it is a simple matter to incorporate the desired colloid, either dry or swelled with water, into the rubber mass so as to disseminate it thoroughly and uniformly throughout the mass. But when the dispersion is to be thereafter effected, the rubber mass while still coherent and in a plastic state is subjected to a different operation, namely one in which portions of the mass are being constantly kneaded, pulled and stretched in the presence of free water which is fed gradually or added from time to time to the dough mixer until the interfacial tension of the globules is reduced to the minimum and the facial tension increased to the maximum, whereupon the globules, with the additional protective coatings imparted by the colloid, separate and disperse in the water. In this manner the process may be carried on commercially with a large batch of rubber which, after being softened and plasticized by the usual compounding rolls, is placed in a two-blade mixer, and then subjected to the requisite kneading, pulling and stretching operation as water is being added in the desired quantities.

Crude rubber, according to present knowledge, consists of a mass of adhering globules, each consisting of a polymerized terpene center $(C_5H_8)_n$ and an exterior film or coating of a colloid of the nature of a proteid. By heating to a fairly definite temperature with or without caustic alkalis, or by intensive mechanical disintegration as in a "colloid mill" so-called, the rubber mass is "depolymerized" or the functioning of the protective coatings is destroyed so that the rubber no longer has the physical characteristics and functions of crude rubber, and cannot be vulcanized with the same factors of time and temperature to produce the results achieved by the vulcanization of the initial crude rubber. By my process, all this "depolymerization" of the mass is avoided, and consequently the dispersed rubber may on removal of the aqueous phase or after coagulation be vulcanized in the same manner as the original crude rubber and produce the same results. And again, the uniformity of particle size of the dispersion to conform to the particles or globules of the original latex is secured, and the time in which a given batch of rubber or rubber compound may be dispersed is reduced to the minimum; and moreover the proportion of colloid requisite in such dispersion is relatively very small.

A paste of dispersed rubber, either alone or containing various materials, prepared as herein described, has a wide application in the arts, of which the following are examples:

1. A dispersed rubber paste containing sulphur and other necessary and desired materials for effecting vulcanization, may be spread in a woven fabric, and after elimination of the water by drying, the resultant rubberized cloth may be used in the manufacture of a large variety of articles such as rubber tires, water hose, raincoats, vehicle tops, balloon fabrics and the like, by the customary methods of fabrication and vulcanization. Or, single strands or cords may be dipped into the past or "milk," of the desired consistency, and after the excess of the rubber compound has been removed these strands or cords may be dried and used in the manufacture of cord tires or any other articles in which such a treated cord or strand is applicable.

2. The paste of dispersed rubber containing the necessary or desired ingredients for vulcanization may be coagulated and/or dried and the product vulcanized either in the form of sheets or in molded irregular forms or pieces.

3. The dispersed rubber may be used as a rubber cement. An illustration of a manner in which this cement may be used is in applying it to the ends of a rubber inner tube for use in the tires of automobiles. One may use either a paste containing a rubber compound (or mixture), which, after drying, is subsequently subjected to heat vulcanization, or a paste of crude rubber only may be used and the splicing operation carried out by the process known as the acid cure. It is evident that its use in this connection eliminates the employment of inflammable solvents, many of which are of a toxic nature. These illustrations are sufficient to indicate that this paste may be used under any circumstances where the ordinary rubber cements may be used.

4. The dispersed rubber paste may be introduced into paper either during the beating of the pulp or as a spreading coat after the paper has been made. The advantages of the use of a dispersed coagulated rubber for these purposes are obvious, for, as hereinbefore indicated, there may be introduced into the dispersed rubber paste such materials as waxes, fats, resins, pigments, etc. By introducing the necessary vulcanizing ingredients, such as sulphur and accelerators, into the paste, the rubber thus incorporated into or spread on the paper may be subjected to the vulcanization process. I have found, particularly with the use of certain saponins, especially soap bark extract, that the adhesion between the rubber globules and the paper fibre is greatly superior to the adhesion between paper fibre and the rubber introduced into the pulp in the form of rubber latex. I find that when using a dispersion of crude rubber only that this crude rubber imparts to the paper all of the advantages which are obtained by adding rubber to paper in the form of rubber latex.

5. The paste of dispersed rubber may be used in the production of leather, either as a filler, as when it is introduced as a "fat liquor", or else as a surface dressing.

6. In the application of the paste to tree surgery and grafting, I have found that it has great advantages over any materials now in use for covering wounds in trees and in making grafts. The rubber paste, when it dries out, adheres firmly to the wood and produces a flexible joint. It may also contain certain suitable disinfecting materials, or materials toxic to insects or other pests which do not cause the coagulation of the rubber dispersed in the paste.

7. When mixed with appropriate filling materials, having disinfecting, healing or strengthening properties, I have discovered that this paste can be used for surgical dressings and in the preparation of splints. The flexibility of such dressing constitutes a very desirable and valuable feature thereof.

8. I have discovered that the paste of dispersed rubber can be used for patching or filling seams, cracks or holes in small boats or canoes, and for filling the seams between boards. For such purposes I am able to secure a high resistance to the penetration of water by incorporating into the dispersed rubber paste, or into the rubber before it is dispersed, suitable materials with water-resistant properties.

9. I have discovered that this paste, by appropriate mixing with inorganic powdered or granulated materials and/or fibrous materials such as asbestos fibre, disintegrated leather or cotton, or other fibres, with or without suitable pigments, may be used in the fabrication of tiling for floor covering, or may be spread, as, for example, by a trowel, in the form of a water-proof flooring, or may be used in lieu of plaster for side walls or ceilings.

10. The paste can be readily mixed with fibrous and/or other materials, and be employed in the manufacture of soles and heels, or other parts of footwear.

11. The paste may be applied to knitted or fabricated materials such as cotton gloves, thereby producing an article which is waterproof, and, in the case of gloves thus prepared, an article is provided which replaces the rubber glove now used by electrical workers.

12. I have also discovered that the paste made from crude rubber can be used in the manufacture of articles of the nature of surgeons' gloves, toy balloons, and the like, which are now commercially manufactured by applying to a form a solution of rubber, and after removal of the solvent, are vulcanized with sulphur chloride according to the process known as the acid cure. By substituting the paste herein described for the rubber solution, I am able to produce an article of a quality at least equal to that now manufactured with the distinct advantage of having eliminated the use of toxic and inflammable solvents. There is an added advantage in that the organic solvents commonly used are frequently lost in the process of manufacture, whereas the use of my paste affords an economy, since no expensive volatile solvents are used.

I have also found that it is possible, by using a paste of dispersed crude rubber as a base, to mix with it a considerable quantity of edible proteins, sugars, waxes, gums, flavoring materials, and/or other substances, and produce gum having all the desirable qualities requisite for a commercial chewing gum.

The foregoing are only a few of the applications which I have made of this discovery, but it is evident that with the discovery and production of a new plastic, such as is provided by the hereindescribed paste of dispersed rubber, I am able to use it for a great variety of purposes wherein its properties are of value.

In all of the foregoing examples of the use of the product it is understood that I do not need to resort to vulcanization. One may prepare a rubber paste which is not vulcanized or one may prepare a rubber paste carrying sufficient and appropriate vulcanizing materials so that the finished article may be subjected, if desired, to any known process of vulcanization.

As an example of the type of materials which may be incorporated with the rubber prior to its dispersion, I may mention the following: Mineral hydrocarbons, such as mineral oil, mineral rubber (the so-called "M. R."); vegetable oils, such as palm oil; organic or inorganic colloidal pigments, such as glue; the so-called rubber substitutes, pigments, such as zinc oxide, talc, etc.; sulphur; organic accelerators of vulcanization, such as tryphenylguanidine, etc. Certain of these materials frequently profoundly alter the nature of the rubber, for I have found that I have been able by the addition of suitable proteins, resins and other materials in proper proportions to obtain a substitute for either gutta percha or balata, and that these substitutes have many, if not all, of the properties of the natural materials themselves.

It will be noted that the hereindescribed process of dispersing rubber may be carried out with simple equipment, that ordinary spreading machines, such as are used in spreading starch, may be used in applying the paste to fabrics.

It is clear that such an operation eliminates, without introducing a fire or other hazard, the costly friction calendar, which requires high temperatures for its operation, exerts crushing pressures on the fabrics, and is expensive in its operation. Obviously, also, one may use a higher grade of rubber compound in my dispersion product than with the friction calender, since in the former case, one does not need to employ the soft low-grade rubbers, oils, etc. which one must use in preparing compounds for the friction calender.

In the preparation of the paste no heat or pressure is required, such as, if used, would "depolymerize" the rubber. The rubber mass becomes warm during its initial "softening" on the mill, but to no greater extent than customary in softening and preparing sheet rubber for vulcanization.

In speaking of the action of the substances used in obtaining dispersions in accordance with my process, I have referred to them as lubricants. In so doing, I have in mind a description of the mechanical method in which they act in water dispersions in enabling the globules to slip over each other during the course of the dispersion. My object in so doing was merely to describe the process as one would see it in operation; and I am not unmindful of the fact that the production and retention of the dispersion may be influenced in whole or in part by the action of the electric charges on the rubber and on the substances used in obtaining dispersions or in effecting coagulation. In using the term "lubricant", I do so because some of the reactions which have been noted are difficult to reconcile with the electrolytic or other electro- theories. For example, although the electro-negative reagents, such as saponin or other soapy materials, may react partly or entirely to neutralize the electro-positive character of certain materials, nevertheless I have found that I can compound electro-positive materials, such as zinc oxide, carbon black, red oxide of iron, etc. with rubber, and obtain a dispersion under exactly identical conditions as when these materials are not present.

So far as generic subject matter is concerned, this is a continuation of my application Serial No. 657,803, filed August 16, 1923.

What I claim is:—

1. A process of forming an aqueous dispersion of coagulated rubber, which comprises incorporating into a coherent mass of rubber a colloidal dispersing agent, and kneading and stretching the mass in the presence of water with the absorption of water until the rubber mass separates and disperses in globular form in the water.

2. A process of forming an aqueous dispersion of coagulated rubber, which comprises reducing the interfacial tension of the coagulated globules which form the coherent rubber mass by causing the mass to absorb a non-solvent liquid, and then, by kneading and stretching, dispersing the mass in the form of globules in water in the presence of a colloidal material.

3. A process of dispersing coagulated rubber in water, which comprises introducing water into a coherent rubber mass and then separating from each other in an aqueous medium the contiguous globules forming the rubber mass by stretching and kneading the mass in the presence of water and a colloid.

4. A process of dispersing crude rubber in water without the aid of a rubber-solvent, which comprises warming and plasticizing a coherent mass, then incorporating a water-carrying colloid into the plastic mass, and kneading and stretching the mass in the presence of water thereby effecting the introduction of water into the mass until a change of phase occurs and the rubber disperses in the water.

5. A process of dispersing crude rubber in water, which comprises introducing water into a coherent rubber mass, and then by a kneading and stretching of the mass in the presence of water, separating from each other in an aqueous medium the adhering globules.

6. A process of dispersing coagulated rubber in water, which comprises introducing water and a water-carrying colloid into the coherent rubber mass, and then separating the resultant mass into its constituent globules in an aqueous medium, by kneading and stretching said mass in the presence of water.

7. A process of dispersing coagulated rubber in water, which comprises introducing water and a colloid into the rubber mass, and then separating the rubber mass into its constituent globules in water in the presence of a lubricating agent by kneading and stretching the mass.

8. A process of dispersing coagulated rubber in water, which comprises introducing water and a water-soluble colloidal substance into the rubber mass, and then separating the rubber mass into its constituent globules in water in the presence of a lubricating agent.

9. A process of dispersing coagulated rubber in water, which comprises introducing water into the coherent rubber mass, and then stretching the rubber mass in the presence of water until the mass separates into substantially uniform particles of the order of the globules of rubber latex.

10. A process of dispersing coagulated rubber in water, which comprises introducing water into the coherent rubber mass, and then stretching the rubber mass in the presence of water and a lubricating agent until the mass separates into its constituent globules in the water.

11. A process of dispersing coagulated rubber in water, which comprises introducing water into the rubber mass, and then kneading and stretching the rubber mass in the presence of water and a colloidal substance until a paste is formed in which the rubber particles constitute the disperse phase.

12. A process of dispersing coagulated rubber in water, which comprises incorporating into a coherent rubber mass water and a water-soluble substance until water is absorbed by the mass, and then stretching and kneading the mass with an aqueous lubricating solution until a smooth aqueous paste is formed in which the rubber particles constitute the disperse phase.

13. A process of dispersing a coherent coagulated product such as crude rubber, gutta-percha or balata in water, which comprises introducing water into such coherent product, and then mixing water and a lubricating agent with the same until a smooth paste is formed in which the previously coagulated product is dispersed in particles substantially like those of the latex from which such coagulated product was derived.

14. A process of dispersing rubber in water, which comprises first incorporating vulcanizing agents and a colloidal dispersing agent into a coherent rubber mass, and kneading and stretching said mass in the presence of water, and gradually incorporating water into the mass until a change of phase occurs and the mass is dispersed in particle size in water.

15. A method of dispersing rubber in water, which comprises incorporating into the coherent rubber mass not over ten per cent by weight of a water-carrying colloid together with water, and then kneading and stretching the mass in the presence of gradually added water until the rubber mass separates into substantially uniform minute particles as the disperse phase of a water dispersion.

16. A process of dispersing coagulated rubber in water, which comprises milling such rubber to form a coherent plastic mass, incorporating water into said mass, mechanically stretching and kneading the resultant mass with water and a lubricating agent until a paste is formed in which substantially uniform rubber particles form the disperse phase and water the continuous phase.

17. A process of dispersing rubber in water, which comprises milling such rubber, sulphur and other compounding materials until a plastic mass is formed, introducing water into the mass, stretching said mass and kneading it with water and a colloid, and gradually adding water during such stretching and mixing until a paste is formed in which the rubber particles constitute a disperse phase and water the continuous phase.

18. A new product which comprises an aqueous vehicle having substantially the entire coagulum of a latex uniformly dispersed in the water, in globules of uniform size and having the essential characteristics of the rubber globules of the latex.

19. A new product comprising an aqueous vehicle having substantially the entire coagulation of a latex uniformly dispersed therein in globules substantially uniform in size and substantially identical with those of the original latex.

20. An aqueous paste comprising previously-coagulated and adherent rubber globules in a separated non-adherent state, the major portion of which are uniformly dispersed in an aqueous medium and in size and characteristics like those of the latex.

21. A paste comprising water and particles of previously-coagulated rubber, the major portion of which are uniformly dispersed therein, and substantially identical in size and physical characteristics with rubber globules of latex.

22. An aqueous dispersion of a previously-coagulated body of the character of rubber, balata or gutta-percha, in which the previously-coagulated body is uniformly dispersed without depolymerization in the water in globules, the major portion of which are substantially identical in size and physical characteristics with those in the latex from which said body was derived.

23. A new product which comprises an aqueous vehicle having dispersed therein crude rubber in the form of separated globules together with vulcanizing agents, the major portion of said globules being substantially identical in size and physical characteristics with those of rubber latex from which the crude rubber was derived.

24. A new product comprising an aqueous vehicle having dispersed therein the separated globules of previously-coagulated rubber of substantially uniform size together with a water-carrying colloid, the major portion of said globules being of the same order of magnitude of the rubber globules of latex.

25. A smooth paste comprising an aqueous vehicle having dispersed therein in substantially uniform size the separated globules of previously-coagulated rubber together with a water-soluble lubricant and sulphur, said paste upon the removal of water being vulcanizable.

26. A smooth paste comprising an aqueous vehicle having dispersed therein in substantially uniform size the separated globules of previously-coagulated rubber together with a water-soluble lubricant, sulphur and an accelerator, said paste upon the removal of the water being vulcanizable.

27. A process of dispersing coagulated rubber in water, which comprises working a colloid into the rubber while it is in a coherent mass, and then adding water while kneading and stretching the mass until a change of phase occurs and the globules of rubber separate and are dispersed in the water.

28. A process of dispersing crude or coagulated rubber in water, which comprises incorporating a colloidal paste into the rubber while it is in coherent mass, and then mixing with the mass water and a lubricant until the rubber globules separate and disperse in the water.

29. A process of dispersing rubber, which comprises incorporating a colloidal dispersing agent into a coherent mass of rubber, and simultaneously kneading said mass and supplying water thereto until the rubber separates into particles as the disperse phase in the continuous water phase of the dispersion.

30. A process of dispersing rubber, which comprises incorporating a colloidal dispersing agent into a coherent mass of rubber, and then kneading and stretching said mass while water is being gradually added thereto until the mass separates into particles dispersed in the water.

31. A process of dispersing rubber, which comprises incorporating a colloidal dispersing agent into a coherent mass of rubber, kneading said mass, and during said kneading gradually adding water and a lubricating agent until the mass separates into particles dispersed in the water.

32. A process of dispersing rubber, which comprises incorporating in a coherent rubber mass an aqueous paste of a colloidal dispersing agent and increasing the plasticity of the rubber mass, then kneading and stretching the mass while adding water thereto until the rubber is separated into particles dispersed in the water.

33. A process of dispersing a vulcanizable rubber compound in water, which comprises milling a vulcanizing agent and a hydrophilic colloid into a coherent mass of rubber, and kneading and stretching said mass while water is being added thereto until the mass separates into particles dispersed in the water.

34. A process of dispersing rubber, which comprises mechanically "breaking down" or plasticizing a coherent mass of rubber, incorporating a colloid and water into such coherent rubber mass while the rubber still constitutes the continuous phase of such mass, and then gradually adding water to and incorporating the same in the mass until the rubber separates and disperses uniformly in minute globules into a continuous water phase.

35. A process of producing an aqueous dispersion of coagulated rubber, which comprises subjecting a coherent mass of rubber to a kneading and stretching operation in the presence of a dispersing agent while gradually adding water thereto until a change of phase takes place and the rubber separates as minute particles in the continuous aqueous medium.

36. A process of producing an aqueous dispersion of coagulated rubber, which comprises plasticizing the rubber and subjecting a coherent mass of such plasticized rubber to a kneading and stretching operation in the presence of a dispersing agent while gradually adding water thereto until a change of phase takes place and the rubber separates as minute particles in the continuous aqueous medium.

37. A process which comprises milling coagulated rubber and incorporating a compounding agent thereinto and subjecting a coherent mass of the compounded rubber to a kneading and stretching operation in the presence of a dispersing agent while gradually adding water thereto until a change of phase takes place and the rubber separates as minute particles in the continuous aqueous medium.

38. A process which comprises milling coagulated rubber and incorporating sulphur thereinto, and subjecting a coherent mass of the sulphur-rubber compound to a kneading and stretching operation in the presence of a dispersing agent while gradually adding water thereto until a change of phase takes place and the rubber separates as minute particles in the continuous aqueous medium.

39. A process of producing an aqueous dispersion of coagulated rubber, which comprises incorporating about 5% by weight of a dispersing agent into a mass of rubber while the rubber is in the continuous phase, and subjecting the continuous mass to a kneading and stretching operation while gradually adding water thereto until a change of phase takes place and the rubber disperses as minute particles in the continuous aqueous medium.

40. A process of producing an aqueous dispersion of coagulated rubber, which comprises incorporating albumin into a mass of rubber while the rubber is in the continuous phase, and subjecting the continuous mass to a kneading and stretching operation while gradually adding water thereto until a change of phase takes place and the rubber disperses as minute particles in the continuous aqueous medium.

41. A process of producing an aqueous dispersion of coagulated rubber, which comprises subjecting a coherent mass of rubber to a kneading and stretching operation in the presence of a dispersing agent while gradually adding water containing a lubricating agent thereto until a change of phase takes place and the rubber disperses as minute particles in the continuous aqueous medium.

42. An aqueous dispersion of previously-coagulated rubber having a smooth, paste-like consistency, the dispersed particles being protected by a dispersing agent and the major portion of said particles being of substantial uniformity and of the same order of magnitude as the rubber particles of latex.

43. An aqueous dispersion of previously-coagulated rubber of a rubber content much greater than that of rubber latex, the dispersed particles being protected by a dispersing agent and the major portion of said particles being of substantial uniformity and of the same order of magnitude as the rubber particles of latex.

44. A smooth, paste-like aqueous dispersion of previously-coagulated rubber, containing about 5% by weight, based on rubber, of a colloidal dispersing agent, the major portion of the dispersed particles being of substantial uniformity and of the same order of magnitude as the rubber paticles of latex.

45. A smooth, paste-like dispersion of previously-coagulated rubber in an aqueous medium, said dispersion containing albumin as the dispersing agent.

46. A smooth, paste-like dispersion of previously-coagulated rubber in an aqueous medium, said dispersion containing a dispersing agent and a lubricating agent.

47. A smooth, paste-like dispersion of previously-coagulated rubber in an aqueous medium, said dispersion containing albumin and a lubricating agent.

48. A smooth, paste-like dispersion of previously-coagulated rubber in an aqueous medium, said dispersion containing albumin and saponin.

In testimony whereof I have affixed my signature.

WILLIAM BEACH PRATT.